United States Patent [19]

Wilkinson

[11] 4,161,011

[45] Jul. 10, 1979

[54] GROUND DISTANCE RELAY EMPLOYING PHASE COMPARATOR MEASUREMENT

[75] Inventor: Stanley B. Wilkinson, Havertown, Pa.

[73] Assignee: General Electric Company, Philadelphia, Pa.

[21] Appl. No.: 879,653

[22] Filed: Feb. 21, 1978

[51] Int. Cl.² .................... H02H 3/26; H02H 7/26
[52] U.S. Cl. ......................... 361/80; 361/85; 324/83 Q
[58] Field of Search .............. 361/80, 81, 78, 79, 361/85, 87; 324/51, 52, 83 R, 83 Q

[56] References Cited

U.S. PATENT DOCUMENTS

| | | | |
|---|---|---|---|
| 3,374,399 | 3/1968 | Dewey | 361/80 |
| 3,626,281 | 12/1971 | Souillard | 361/85 X |
| 3,898,530 | 8/1975 | Perez-Cavero | 361/80 X |
| 4,034,269 | 7/1977 | Wilkinson | 361/79 |
| 4,091,433 | 5/1978 | Wilkinson | 361/79 X |

Primary Examiner—Patrick R. Salce
Attorney, Agent, or Firm—William Freedman; Carl L. Silverman

[57] ABSTRACT

A ground distance relay employing phase angle comparator measurement is provided with additional input signals. In one embodiment, a two input ground distance relay is provided with two additional input signals. In this embodiment, the first two input signals comprise an OPERATE SIGNAL of the form IZ-V and a POLARIZING SIGNAL of quadrature shifted form. The third input signal comprises a #2 POLARIZING SIGNAL which is related to the zero sequence voltage at the relay. The fourth input signal comprises a CURRENT SUPERVISION SIGNAL which is related to the zero sequence current at the relay. These four input signals are directed to coincidence and timer circuitry. The presence of these four inputs provides improved relay security against undesirable relay operation for several existing problems. For example, additional security is provided for situations in which a single line to ground fault occurs at or just beyond the relay balance point where fault resistance may cause undesirable relay operation. Also, additional security is provided for situations in which double line to ground faults occur. Other embodiments are disclosed.

18 Claims, 13 Drawing Figures

GROUND DISTANCE RELAY EMPLOYING PHASE COMPARATOR MEASUREMENT

BACKGROUND OF THE INVENTION

The present invention relates to ground distance protective relays, and more particularly to a ground distance relay which employs a phase comparator method of measurement.

As a result of advancements in solid state technology, static protective relays have been developed. Exemplary circuits for phase comparator static relays are disclosed in my U.S. Pat. No. 4,034,269, entitled "Protective Relay Circuits" issued July 5, 1977. This patent is assigned to the assignee of the present application and is hereby incorporated by reference in the present application. Briefly, U.S. Pat. No. 4,034,269 discloses circuit means for discriminating between low level and high level faults such that substantially no delay occurs in the detection of high level faults.

In the phase comparator method of measurement, the relay operates by measuring the angle between two or more phasors derived within the relay. The phase comparator method of measurement allows the formation of characteristics, such as the MHO and offset MHO characteristics, which are substantially the same as the corresponding characteristics of conventional electromechanical relays.

FIGS. 6 and 7 of U.S. Pat. No. 4,034,269 disclose exemplary circuits suitable for a distance relay wherein the phase angle comparator method of measurement is employed. Referring now to FIG. 1A of the present application, a portion of the FIG. 6 circuit of U.S. Pat. No. 4,034,269 is shown with several modifications required for use as a ground distance relay. For purposes of clarity, where possible, like reference numerals have been employed to represent like elements. Briefly, in a phase A ground distance relay of FIG. 1A, a coincidence detector 286 functions to detect phase coincidence between a polarizing signal ($V_{BC} \angle 90°$) and an operating signal ($I_A Z_R + KI_0 Z_R - V_{AN}$). These signals will be discussed more fully in the Detailed Description of the Invention in the present application. A timer 288 measures the duration of phase coincidence and operates when phase coincidence occurs for a predetermined minimum time equal to the relay operate time. It is to be noted that, for a fault within the intended reach of the relay, phase coincidence is greater than $\frac{1}{4}$ cycle or 4.167 ms so that the operate time is ordinarily set at 4.167 ms. Also, it is to be noted that, to those skilled in the art, the polarizing signal preferably comprises the quadrature voltage shifted 90° leading, $V_{BC} \angle 90°$ so that the shifted voltage is in phase with the prefault voltage of the faulted phase. The combination of this polarizing signal and the operating signal produces a "variable" MHO characteristic. That is, a characteristic whose diameter is a function of the source impedance behind the relay and the relay reach setting. Such a characteristic is shown in FIGS. 1B, 1C. FIG. 1C shows an advantage of the "variable mho" characteristic is its adaptability to changing arc resistance $R_F$. This type of relay is termed a quadrature polarized ground distance relay. The advantage of the quadrature polarized ground distance relay is its excellent coverage of fault resistance for a single line to ground fault.

Although quadrature polarized static ground distance relays of the type shown in FIG. 1A are successful for many applications, such relays do present some security problems. One such problem is the difficulty in establishing through calculations the performance of the "unfaulted phase" unit on faults involving ground (particularly in the presence of heavy load transfer) in order to establish relay settings which will prevent misoperation. Another problem is the possibility of overreach on single line to ground, or double line to ground, faults with substantial ground fault resistance and adverse load flow.

Accordingly, it is a general object of my invention to provide an improved static ground distance relay employing phase angle comparator operation.

Another object of my invention is to provide a circuit for such a relay wherein undesired relay operation under heavy load transfer conditions is substantially eliminated.

Another object of my invention is to provide a circuit for such a relay wherein unfaulted phases do not see a fault in the non tripping direction when a single line to ground fault occurs on another phase.

Another object of my invention is to provide a circuit for such a relay wherein overreaching on single line to ground faults with high fault resistance is substantially eliminated.

Another object of my invention is to provide a circuit for such a relay wherein overreaching on double line to ground faults with high fault resistance is substantially eliminated.

Another object of my invention is to provide a quadrature polarized static ground distance relay having the combined functional characteristics of a quadrature polarized ground distance relay and a faulted phase selector.

Another object of my invention is to provide a quadrature polarized static ground distance relay having the combined functional characteristics of a quadrature polarized ground distance relay and a compensated zero sequence directional unit.

SUMMARY

In one form of my invention, I provide a ground distance protective relay for a transmission line in an a-c power system. The relay circuit includes phase angle comparator operation wherein AND circuit means is responsive to phase coincidence of a plurality of input signals thereto. One input signal is an operating signal and another input signal is a first polarizing signal. The operating signal is related to the sum of (1) the product of transmission line current and a replica impedance of the transmission line and (2) transmission line voltage. The polarizing signal is related to transmission line voltage. The circuit includes TIMER circuit means responsive to an output signal of the AND circuit means for producing a TIMER output signal when the phase coincidence of the plurality of signals is of a predetermined duration.

The circuit further includes means for providing a second polarizing signal which is related to the zero sequence voltage of the transmission line at the relay and means for providing a current supervision signal. The current supervision signal being related to the product of the zero sequence current of the transmission line at the relay and a replica impedance of the transmission line. The circuit includes AND circuit means which is reponsive to the phase coincidence of: (1) the operating signal, (2) the first polarizing signal, (3) second polarizing signal, and (4) the current supervision signal. The TIMER circuit means producing the TIMER circuit signal when the phase coincidence of the four input signals is of a predetermined duration.

BRIEF DESCRIPTION OF THE DRAWINGS

While the specification concludes with claims particularly pointing out and distinctly claiming that which is regarded as the present invention, the objects and advantages of this invention can be more readily ascertained from the following description of preferred embodiments, when read in conjunction with the accompanying drawings, in which:

DETAILED DESCRIPTION OF THE INVENTION

Figure 6:
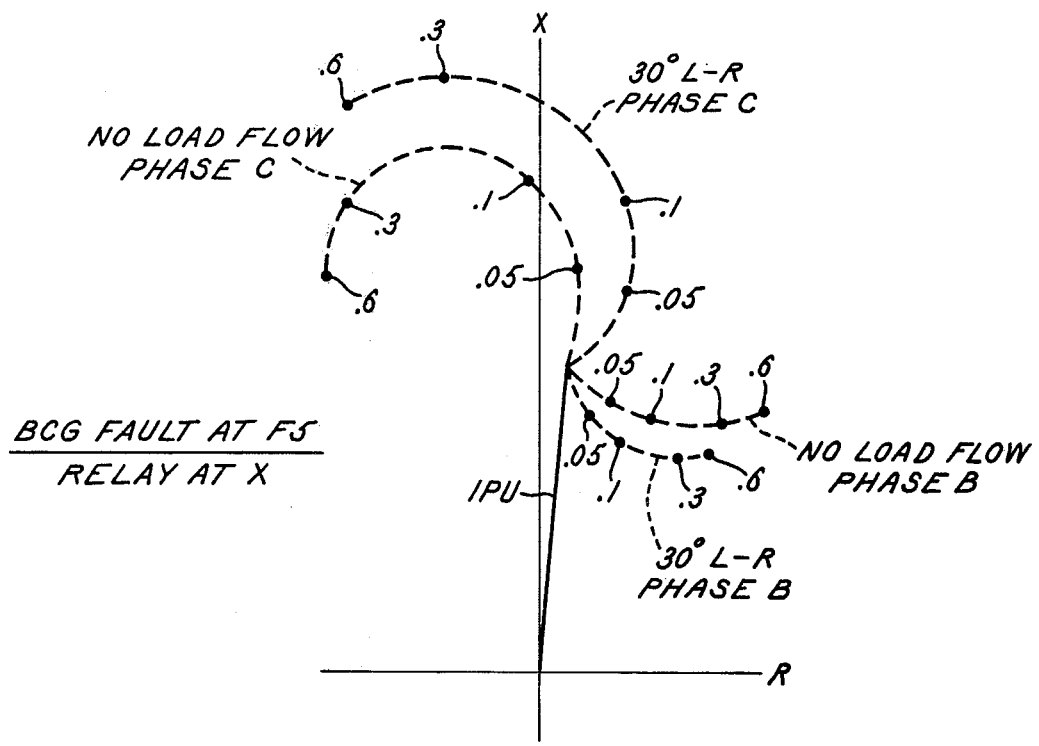
FIG. 6 is a graph depicting compensated impedance seen by a ground distance relay under double line to ground fault conditions with varying fault resistance magnitude.

Referring again to FIG. 1A of the present application a portion of the FIG. 6 circuit of U.S. Pat. No. 4,034,269 is shown with the previously described modifications so that the circuit is suitable for ground distance relay applications.

Figure 1A:
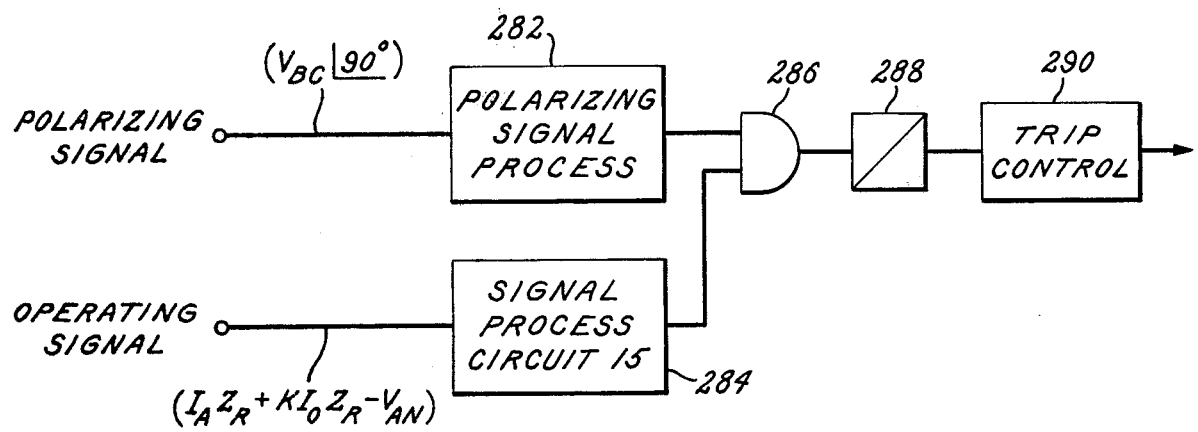
FIG. 1A is a block diagram of a portion of a circuit for a ground distance relay of the prior art. This block diagram is similar to FIG. 6 of U.S. Pat. No. 4,034,269, entitled "Protective Relay Circuits" issued July 5, 1977 to Wilkinson and assigned to the assignee of the present application. However, FIG. 1A of the present application includes several modifications suitable for ground distance relay applications. For purposes of clarity, the reference numerals employed in FIG. 6 of U.S. Pat. No. 4,034,269 and FIG. 1A of the present application are the same.

In accordance with the present invention, several additional modifications are made to the two input ground distance relay shown in FIG. 1A. In one form of the ground distance relay of the present invention, a four input phase angle comparator is provided. This combination provides the combined functional characteristics of a quadrature polarized ground distance unit and a compensated zero sequence directional unit. As will be discussed later, the combined functional characteristics of such a relay eliminate many of the problems encountered in the use of two input ground distance relays.

Figure 2:
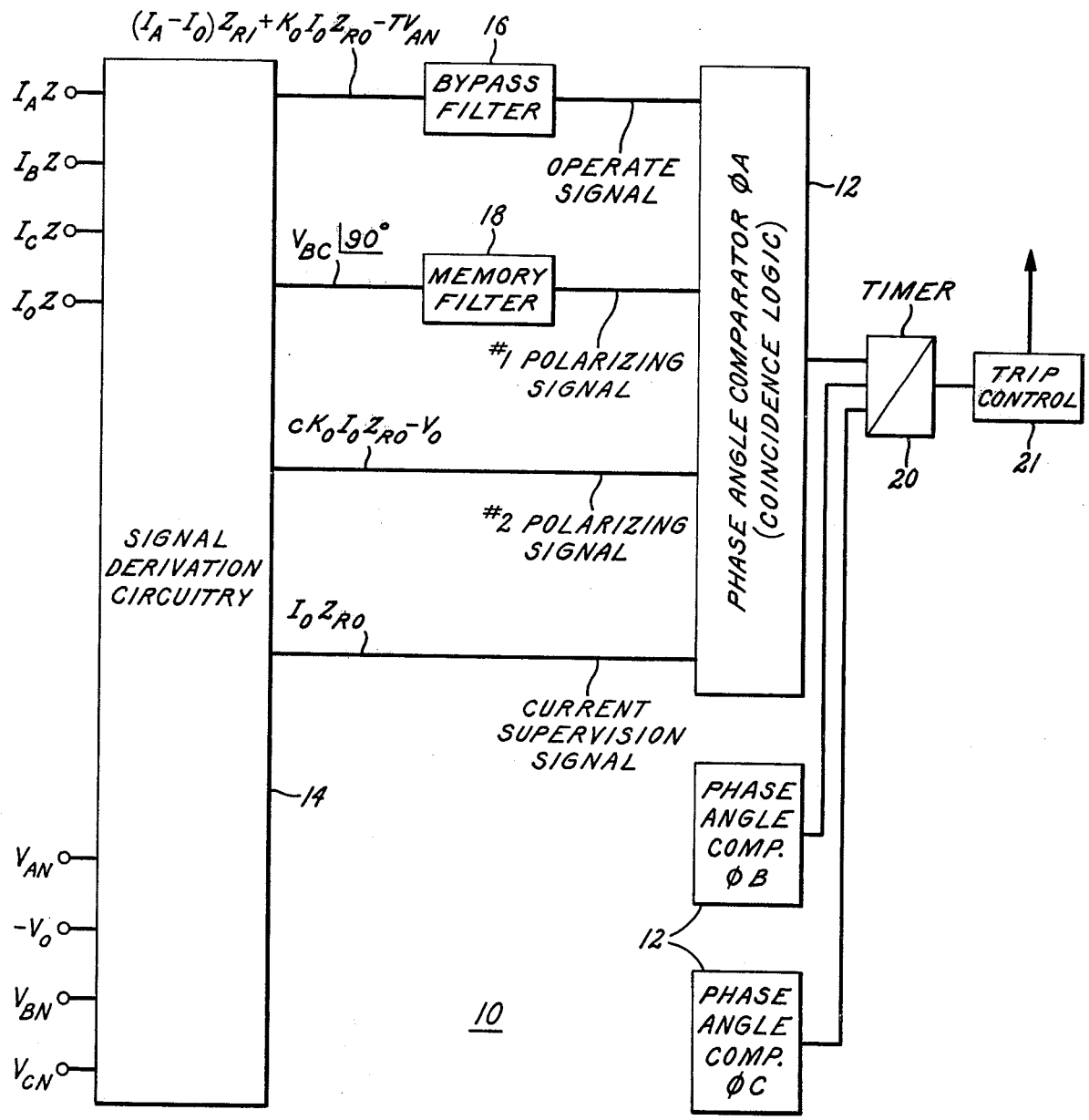
FIG. 2 is a functional block diagram of one form of ground distance relay of the present invention employing a four input phase angle comparator.

More particularly, referring now to FIG. 2, a functional block diagram of one form of ground distance relay of the present invention is generally designated 10. For purposes of simplicity, the circuitry for deriving the various input signals is shown in block form in FIG. 2, it being understood that such circuitry comprises appropriate potential transformers, current transformers, and transactors (replica impedance) suitably interconnected and coupled to the power system transmission lines in conventional circuits. The relay includes a four input phase angle comparator 12 for each phase. The phase angle comparator 12 is coupled to receive input signals provided by signal derivation circuitry 14. An OPERATE SIGNAL from circuitry 14 is preferably pressed through a BYPASS/FILTER 16 before reaching the comparator 12. The BYPASS/FILTER 16 is preferably of the type disclosed in the previously referenced Wilkinson patent and functions to provide the desired response to low level and high level faults. A #1 POLARIZING SIGNAL from circuitry 14 is preferably passed through a MEMORY/FILTER 18 before reaching the comparator 12. The MEMORY/FILTER 18 is preferably of the type disclosed in the referenced Wilkinson patent (see FIG. 7 and column 10, line 60 through column 11, line 33 of the Wilkinson patent). The third input signal to the comparator 12 comprises a #2 POLARIZING SIGNAL. The fourth input signal comprises a CURRENT SUPERVISION SIGNAL. The phase angle comparator 12 develops an output when there is coincidence of the four input signals, such output continuing as long as coincidence continues. The output of the phase angle comparator 12 is directed to a timer 20 which measures coincidence duration for the four inputs. The output of timer 20 is fed to trip control circuit 21.

Referring now to each of the four input signals to the phase angle comparator, for phase A operation, the OPERATE SIGNAL comprises the sum of the following three components:

(i) $(I_A - I_0) Z_{R1}$, which provides the replica impedance voltage for the positive and negative sequence current components. It also includes the positive sequence base reach adjustment. $I_A$ is proportional to the faulted phase current and $I_0$ is proportional to the zero sequence component of the phase current. $Z_{R1}$ is the positive and negative sequence base reach impedance with an impedance angle approximately equal to that of the positive sequence impedance of the protected line;

(ii) $K_0 I_0 Z_{R0}$, which provides the replica impedance voltage from the zero sequence current component. $K_0$ is a ratio tap to compensate for the magnitude ratio between the zero and positive sequence line impedance. $Z_{R0}$ is the zero sequence base reach impedance with an impedance angle approximately equal to that of the zero sequence impedance of the line. $K_0$ is normally adjusted so that $$\frac{Z_{R1}}{K_o Z_{RO}} = \frac{\text{Positive sequence line impedance}}{\text{Zero sequence line impedance}}$$

and (iii) $-TV_{AN}$, which is the "restraint voltage" part of the OPERATE SIGNAL where T is an adjustable percentage restraint setting and $V_{AN}$ is the phase A to ground voltage.

The OPERATE SIGNAL determines the relay reach $Z_R$ at the replica impedance angles in accordance with the formula, $$Z_R = \frac{Z_{R1}}{T}$$

where $K_0$ is adjusted as described above.

Figure 1B:
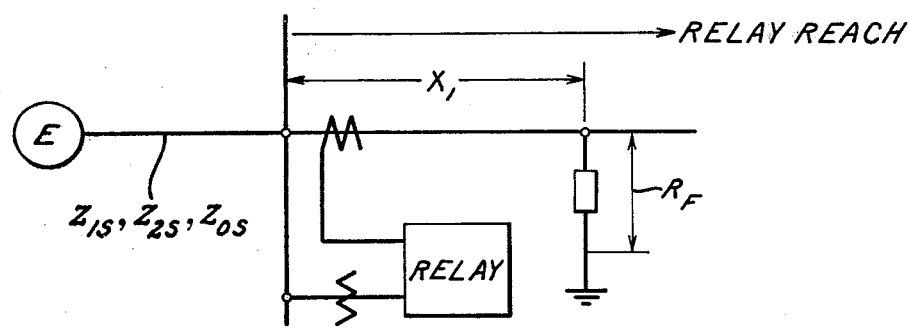
FIGS. 1B, 1C respectively depict a simple power system and a variable mho characteristic associated therewith.
Figure 1C:
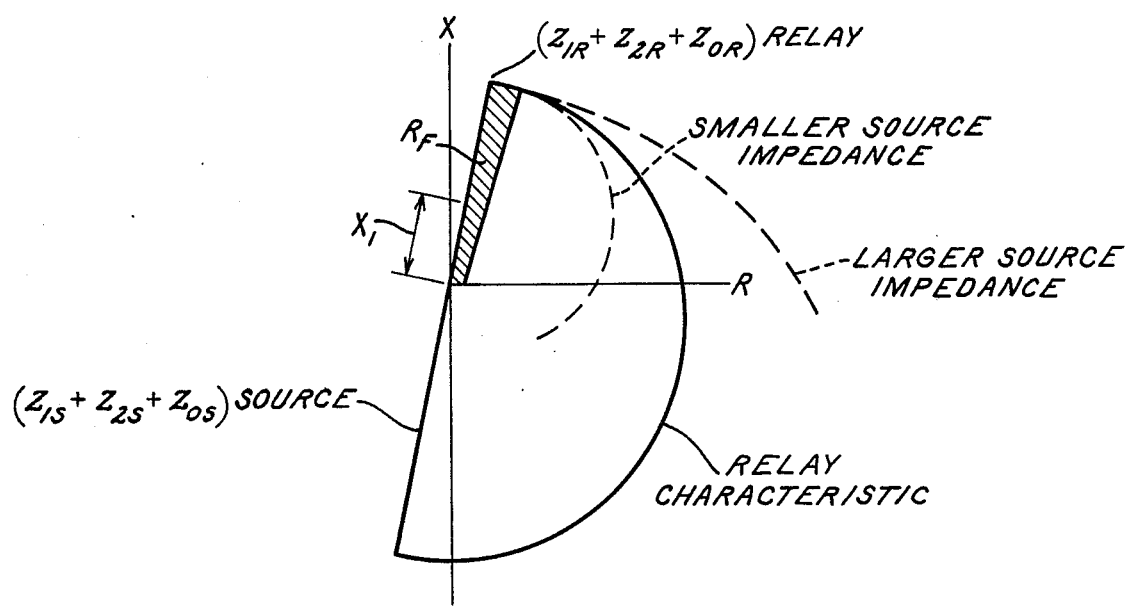

The combination of the OPERATE SIGNAL and the #1 POLARIZING SIGNAL produces the "variable mho" characteristic of the quadrature polarized ground distance relay (see FIGS. 1B, 1C). As mentioned in the Background of the Invention, the advantage of the quadrature polarized ground distance relay is its excellent coverage of fault resistance for signal line to ground faults. However, a disadvantge of the quadrature polarized distance relay has been the difficulty in establishing through calculations the performance of the "unfaulted phase" unit on faults involving ground (particularly in the presence of heavy load transfer), and the possibility of one of the units over-reaching on single line to ground or double line to ground faults with substantial ground fault resistance. To retain the advantage of the quadrature polarized relay but eliminate these disadvantages, I provide the third and fourth inputs to the phase angle comparator 12.

The third input to the phase angle comparator 12 is the #2 POLARIZING SIGNAL $cK_0I_0Z_{Ro}-V_o$. This signal is primarily $-V_o$ (zero sequence voltage at the relay). Actually, the signal is proportional to $V_o$. The current compensation signal component, $cK_0I_0Z_{Ro}$, is in phase with $-V_o$ for internal faults, and is intended to provide a reliable polarizing signal when the relay is employed on a very long line with a very small zero sequence source impedance behind the relay where $-V_o$ may be so small as to be distorted by error quantities. The c factor is a design constant and is typically selected such that the polarizing signal will be correct for external faults as long as $K_0Z_{Ro}$ is equal to or less than twice the zero sequence impedance of the line.

The fourth input signal to the phase angle comparator 12 is the CURRENT SUPERVISION SIGNAL $I_0Z_{Ro}$. This signal is primarily intended to prevent operation of the distance unit in the absence of zero sequence current. The absence of such current will occur prior to automatic reclosing a line equipped with shunt reactors. During the reclosing period, the line voltage will oscillate at the normal frequency determined by the shunt reactors and the shunt capacitance. If the natural frequency is quite low, a relay lacking the SUPERVISION SIGNAL might operate on the natural frequency transients during the reclosing period and initiate re-tripping even though the reclosure would otherwise be successful.

It is to be noted that the #2 POLARIZING SIGNAL $(ck_0I_0Z_{Ro}-V_o)$ and the CURRENT SUPERVISION SIGNAL $(I_0Z_{Ro})$ combine to form a zero sequence directional unit. Hence, the four input unit of the present invention is both a distance unit and a zero sequence directional unit. Also, the #2 POLARIZING SIGNAL $(cK_0I_0Z_{Ro}-V_o)$ and the #1 POLARIZING SIGNAL $(V_{BC}\ \llcorner\ 90°$ for phase A) provide a phase selection function. This means that typically, for a single line to ground fault, the #1 and #2 POLARIZING SIGNALS are substantially in phase for the faulted phase unit, and more than 90° out of phase in the unfaulted phase units.

In response to the above-described four input signals, the four input phase angle comparator 12 produces an output to the timer 20 when all the signal inputs have the same instantaneous polarity. The maximum block width of the signal into the timer 20 is established by the two input signals with the maximum angular separation between them. Preferably, the timer 20 employed to measure the output blocks of the phase angle comparator 12 is an integrating type of timer which requires a larger block width to operate on the first block than is required for a steady state train of blocks. Hence, the initial transient characteristic of the relay is a "narrower" characteristic than the steady state characteristic, providing a higher degree of security in the presence of transients which typically occur at fault inception and clearing. In addition, the integrating timer provides a faster average operating time over the complete range of fault incidence angles, as compared to a non-integrating timer.

OPERATION

Figure 3:
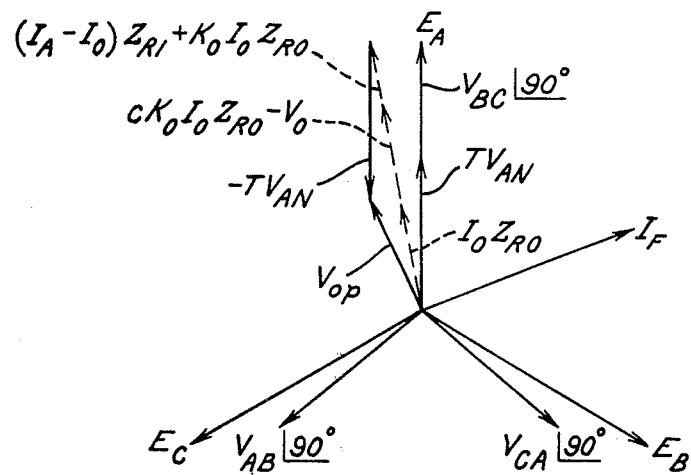
FIG. 3 is a three phase voltage phasor diagram showing a phase A to ground fault with some fault resistance.

Referring now to FIG. 3, a three phase (A, B, C) voltage phasor diagram depicts the relationship of the above-described four inputs to the phase angle comparator 12 under a condition in which a typical phase A to ground fault (with some resistance) is present. For purposes of convenience, such a single line to ground fault will sometimes be designated SLG. Inspection of this FIG. indicates that, for a phase A to ground fault, the maximum angular separation between any two of the four inputs to the phase A angle comparator is the angular separation between the #1 POLARIZING SIGNAL ($V_{BC}\ \llcorner\ 90°$) and the OPERATE SIGNAL $[(I_A-I_o)\ Z_{R1}+K_0I_0Z_{Ro}-TV_{AN}]$, or $V_{op}$. The #2 POLARIZING SIGNAL $(cK_0I_0Z_{Ro}-V_o)$ and the CURRENT SUPERVISION SIGNAL $(I_0Z_{Ro})$ have intermediate phase positions so that, under these conditions, their presence does not affect the operating characteristics of the four input phase A ground distance unit of the present invention. Thus, for a typical single phase to ground fault, the four input phase A ground distance unit of the present invention has an operating characteristic which is established by the #1 POLARIZING SIGNAL and the OPERATE SIGNAL, these signals comprising the signals employed in a conventional two input quadrature polarized ground distance unit. Therefore, the dependability of the two input unit for SLG faults is generally preserved in the present invention.

The operation of the four input ground distance relay of the present invention will now be described under those conditions which present security problems for the two input ground distance relay of the prior art.

Figure 4:
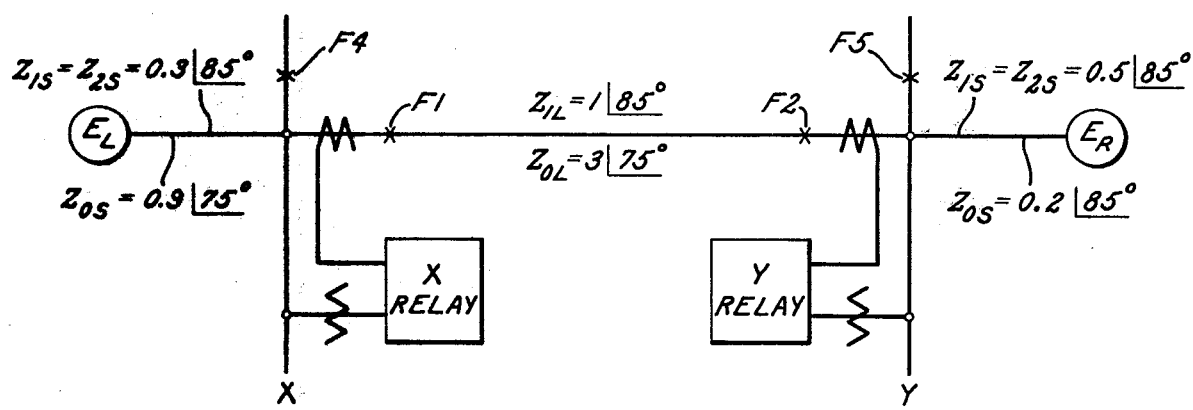
FIG. 4 is a diagrammatic representation in one-line form of a portion of a simple power system.

Referring now to FIG. 4, a one line diagram of a simple power system is shown for purposes of illustration. The power system includes various fault locations (F) and two relay locations (X, Y). Fault locations F4, F1 are intended to be positioned at the end of the protected line as seen by relay Y. Similarly, fault locations F2, F5 are at the end of the protected line as seen by relay X. The sources $E_L$ and $E_R$ are shown with impedances and impedance angles which are intended to be typical in relation to the line impedances of the protected line between the relay locations X, Y.

In order to appreciate the capabilities of the four input relay of the present invention, reference will also be taken to several curves and Tables. The curves were plotted from data and calculations for the apparent compensated impedance seen by the ground distance relays of FIG. 4, for faults involving ground. The compensated impedance Z is the line-to-neutral voltage at the relay location divided by compensated phase currents. For example:

$$Z = \frac{V_{AN}}{I_A + \frac{Z_{OL} - Z_{IL}}{Z_{OL}} I_o}$$

where $$\frac{Z_{OL} - Z_{IL}}{Z_{OL}}$$

is a complex ratio of zero and positive sequence line impedance. The curves include the effects of fault resistance and load flow. The Tables were derived from the data and calculations and include approximated values. The Tables show the relay input signals and operation for the described two input relay and for the four input relay of the present invention.

Referring now to Table 1 below, the results are taken for a SLG fault at F1 (balance point for relay Y) in the power system of FIG. 4. L-R and R-L indicate direction of load flow, with 30° and 60° indicating the angle between the two effective sources $E_L$, $E_R$. $R_F$ is the fault resistance, measured in per unit of positive sequence impedance of the line. The positive sequence impedance of the protected line, $Z_{1L}$, is 1 per unit (1 PU). The numbers in the columns for the four inputs represent the angular relation of a particular input with respect to $V_{AN}$ at $E_L$. The numbers in column A represent the duration of coincidence (same polarity) for all four timer inputs of the four input relay. The numbers in column B represent the duration of coincidence for the first two timer inputs, i.e., the other two input ground distance relay previously discussed. The underlined numbers represent conditions where the relay operates for a 90° characteristic timer setting.

Of particular interest in Table 1 is the essentially constant angular relationship of the OPERATING SIGNAL ($V_{op}$) to the #2 POLARIZING SIGNAL (#2 Pol) or the CURRENT SUPERVISION SIGNAL $I_oZ_{Ro}$ for a fault F1 at the end of the relay reach, thereby precluding the undesirable operation of the Y relay. For convenience, this is shown below by asterisks. The asterisks show that, in those instances of faults at, or near the balance point of the prior art two input relay where undesirable Y relay operation would occur, the four input relay of the present invention will not operate. Hence, additional security is provided for relay Y.

TABLE I

| | | | | | | | | SLG FAULT AT F1 | | | | | | | |
|---|---|---|---|---|---|---|---|---|---|---|---|---|---|---|---|
| | | Phase A Relay at X | | | | | | | | Phase A Relay at Y | | | | | |
| Load-Flow | $R_F$ | $V_{OP}$ | #1Pol | #2Pol | $I_OZ_{RO}$ | 4 Input A | 2 Input B | Load Flow | $R_F$ | $V_{OP}$ | #1Pol | #2Pol | $I_OZ_{RO}$ | 4 Input A | 2 Input B |
| 30° R-L | .05 | 9 | 5 | 8 | 8 | 176 | 176 | 30° R-L | .05 | 112 | 22 | 8 | 7 | 75* | 90 |
| | .1 | 17 | 5 | 14 | 14 | 168 | 168 | | .1 | 119 | 22 | 15 | 14 | 75 | 85 |
| | .5 | 66 | 5 | 46 | 46 | 119 | 119 | | .5 | 150 | 22 | 46 | 45 | 52 | 52 |
| | .75 | 87 | 5 | 55 | 55 | 98 | 98 | | .75 | 159 | 22 | 55 | 54 | 43 | 43 |
| | 1 | 105 | 5 | 60 | 60 | 80 | 80 | | 1 | 165 | 22 | 60 | 59 | 37 | 37 |
| | 2 | 149 | 5 | 69 | 69 | 36 | 36 | | 2 | 174 | 22 | 70 | 69 | 28 | 28 |
| | 20 | 197 | 5 | 79 | 79 | 0 | 22 | | 20 | 184 | 22 | 79 | 78 | 18 | 18 |
| 60° R-L | .05 | 8 | 9 | 12 | 12 | 176 | 179 | 60° R-L | .05 | 117 | 44 | 12 | 11 | 74* | 107 |
| | .1 | 16 | 9 | 18 | 18 | 171 | 173 | | .1 | 123 | 44 | 19 | 18 | 75* | 101 |
| | .5 | 60 | 9 | 50 | 50 | 129 | 179 | | .5 | 155 | 44 | 50 | 49 | 69 | 69 |
| | 1.0 | 100 | 9 | 64 | 64 | 89 | 89 | | 1.0 | 169 | 44 | 65 | 63 | 55 | 55 |
| | 2.0 | 166 | 9 | 73 | 73 | 23 | 23 | | 2.0 | 178 | 44 | 74 | 73 | 46 | 46 |
| 30° L-R | .05 | 9 | −5 | −2 | −2 | 166 | 166 | 30° L-R | .05 | 103 | −22 | −2 | −3 | 55 | 55 |
| | .1 | 17 | −5 | −4 | 4 | 158 | 158 | | .1 | 109 | −22 | 5 | 4 | 49 | 49 |
| | .5 | 63 | −5 | 36 | 36 | 112 | 112 | | .5 | 141 | −22 | 36 | 35 | 19 | 19 |
| | .75 | 78 | −5 | 45 | 45 | 97 | 97 | | .75 | 150 | −22 | 45 | 44 | 8 | 8 |
| | 1 | 91 | −5 | 50 | 50 | 84 | 84 | | 1 | 155 | −22 | 51 | 50 | 8 | 3 |
| 60° L-R | .05 | 8 | −9 | −6 | −6 | 163 | 163 | 60° L-R | .05 | 99 | −44 | −6 | −7 | 37 | 37 |
| | .1 | .16 | −9 | 0 | 0 | 155 | 155 | | .1 | 105 | −44 | 1 | 0 | 31 | 31 |
| | .5 | 58 | −9 | 32 | 32 | 113 | 113 | | .5 | 137 | −44 | 32 | 31 | 0 | 1 |
| | 1.0 | 81 | −9 | 46 | 46 | 90 | 90 | | 1.0 | 151 | −44 | 47 | 46 | 0 | 15 |

Figure 5:
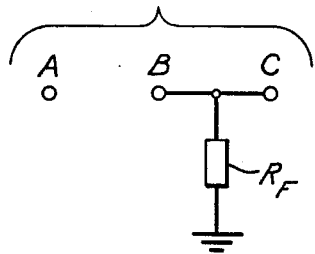
FIG. 5 depicts the power system of FIG. 4 in three-phase form with a double line to ground fault involving phases B and C.

Another consideration in evaluating relay performance with load flow is the effect of load flow in the "classical problem" of ground distance relays overreaching on double line to ground faults with ground fault resistance. Such a double line to ground fault is shown in FIG. 5. FIG. 6 shows the plot of the calculated compensated impedance with increasing fault resistance, $R_F$, on an R-X diagram for the B and C phases on a BC to ground fault. The power system is the same as that shown in FIG. 4 with the relay location at X and the fault at F5.

It is apparent from FIG. 6 that the increased fault resistance causes the fault impedance to fall well within the B phase operating characteristic of most types of ground distance relays (see FIG. 1C), and particularly with load flow in the tripping direction.

Table II below indicates the four inputs to the B and C phase unit comparators under the same double line to ground fault condition. It is seen that where the $V_{op}$ and No. 1 polarizing signals are less than 90° out of phase, that, is, where a simple two input quadrature polarized relay would operate, the $V_{op}$ and No. 2 polarizing signal of the four input relay are greater than 90° out of phase by a constant margin.

TABLE II

BCG FAULT AT F5
Phase B Relay at X

| Load Flow | $R_F$ | $V_{OP}$ | #1Pol | #2Pol | $I_OZ_{RO}$ | 4 Input A | 2 Input B |
|---|---|---|---|---|---|---|---|
| 30° L-R | .05 | 275 | 239 | 179 | 179 | 84 | 144 |
| 30° L-R | .1 | 290 | 238 | 195 | 195 | 85 | 128 |
| 30° L-R | .3 | 317 | 240 | 221 | 221 | 85 | 103 |
| 30° L-R | .6 | 327 | 241 | 231 | 231 | 84 | 94 |

Phase C Relay at X

| Load Flow | $R_F$ | $V_{OP}$ | #1Pol | #2Pol | $I_OZ_{RO}$ | 4 Input A | 2 Input B |
|---|---|---|---|---|---|---|---|
| 30° L-R | .05 | 275 | 112 | 179 | 179 | 17 | 17 |
| 30° L-R | .1 | 290 | 111 | 195 | 195 | 1 | 1 |
| 30° L-R | .3 | 317 | 109 | 221 | 221 | 0 | 28 |
| 30° L-R | .6 | 327 | 110 | 231 | 231 | 0 | 37 |

Thus, the four input relay of the present invention exhibits desirable behavior under double line to ground (LLG) faults. That is, the four input relay of the present invention provides security against the undesirable operation for double line to ground faults.

Figure 7:
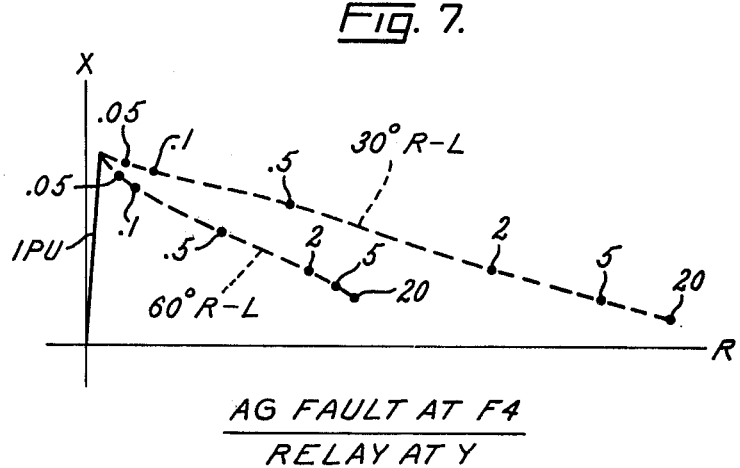
FIG. 7 is a graph depicting compensated impedance seen by a ground distance relay under single line to ground fault conditions with varying fault resistance magnitude.

Another security problem with the described two input ground distance relay may occur with a single line to ground fault under heavy load flow conditions. Referring now to FIG. 7, the compensated impedance seen by a ground distance relay under single line to ground fault conditions with heavy load flow is shown. More particularly, FIG. 7. shows the compensated impedance seen by a Phase A relay at Y for an A to ground fault at F4 in the power system of FIG. 4. In FIG. 7, two levels of R-L load flow are shown with the fault resistance $R_F$ varied from zero to 20 per unit.

Referring now to Table III below, this Table being similar to the right hand portion of Table I, a tabulation of the inputs for FIG. 7 shows that the described two input relay of column B is insecure for heavier load flows. As done earlier, asterisks are employed to designate more clearly those instances in which the four input relay of the present invention provides added security against undesirable operation. This security is provided by the third and/or fourth inputs, as in the case of the previously described double line to ground fault (FIG. 6 and Table II).

TABLE III

AG Fault at F4
Phase A Relay at Y

| Load Flow | $R_F$ | $V_{OP}$ | #1 | #2 | $I_OZ_{RO}$ | 4 Input A | 2 Input B |
|---|---|---|---|---|---|---|---|
| 30° R-L | .05 | 112 | 22 | 8 | 7 | 75* | 90 |
|  | .1 | 118 | 22 | 15 | 13 | 75 | 84 |
|  | .5 | 150 | 22 | 46 | 45 | 52 | 52 |
|  | 1 | 164 | 22 | 60 | 59 | 38 | 38 |
| 60° R-L | .05 | 116 | 44 | 12 | 11 | 75* | 108 |
|  | .1 | 123 | 44 | 19 | 18 | 75* | 101 |
|  | .5 | 154 | 44 | 50 | 49 | 70 | 70 |
|  | 1 | 169 | 44 | 65 | 63 | 55 | 55 |

Thus, in connection with security, the four input relay of the present invention is inherently secure for several conditions which previously required calculations for each application.

OTHER EMBODIMENTS

Figure 8:
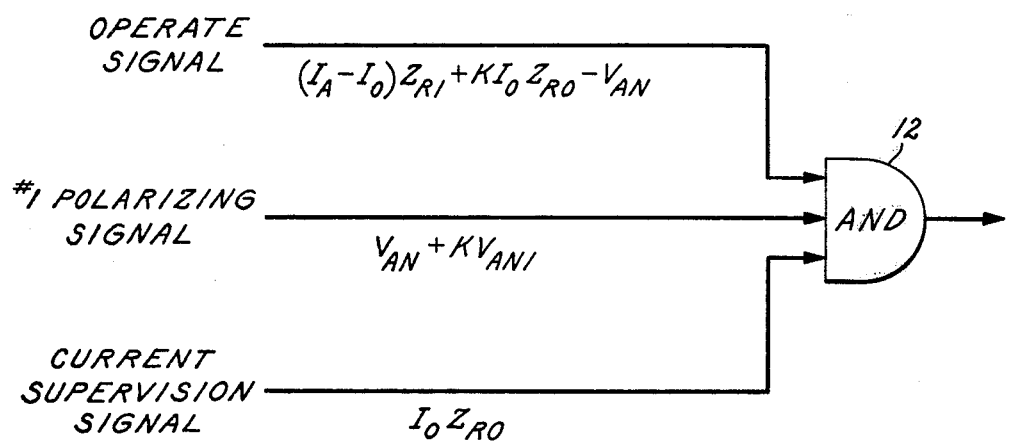
FIGS. 8 and 9 show a portion of a functional block diagram of other forms of the ground distance relay of the present invention.
Figure 9:
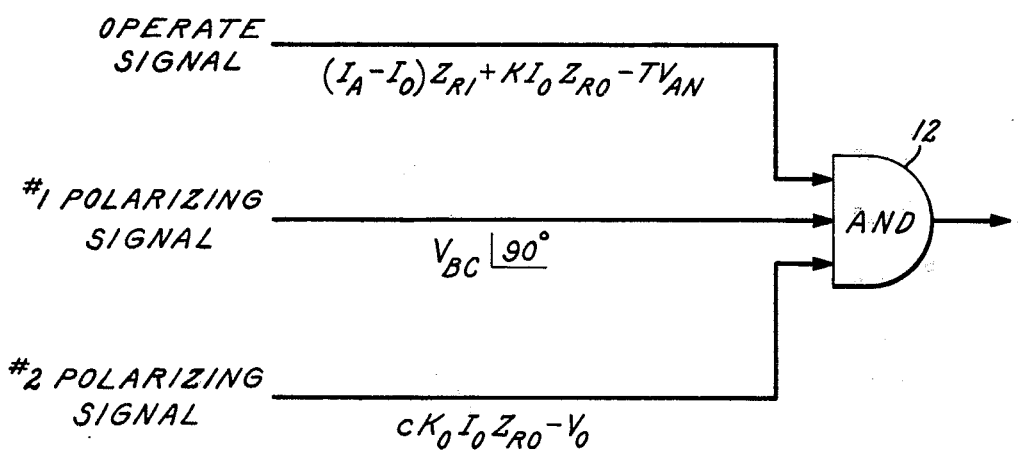

For certain applications, modifications to the four input ground distance relay hereinbefore described are appropriate. For example, for a single pole tripping and reclosing application, a three input phase angle comparator ground distance relay may be provided, as partially shown in FIG. 8. In such an application, the #2 POLARIZING SIGNAL $-V_o+(cK_oI_oZ_{Ro})$ is omitted and the #1 POLARIZING SIGNAL may comprise $V_{AN}+KV_{AN1}$ (positive sequence component of $V_{AN}$ voltage) since the quadrature polarizing signal and $-V_o$ may be incorrect during the open pole period when the potential source is on the line side of the breaker. In another three input phase comparator ground distance relay of the present invention, the CURRENT SUPERVISION SIGNAL ($I_oZ_{Ro}$) may be omitted, as partially shown in FIG. 9. The three input relay of FIG. 9 is suitable for applications in which overcurrent supervision is provided by a separate relay element.

In another variation, the current compensating signal $cK_oI_oZ_{Ro}$ may be omitted from the #2 POLARIZING SIGNAL when the relay is used as a blocking relay, since, for such an application, the line impedance forms part of the source impedance behind the relay. In addition, the #1 POLARIZING SIGNAL $V_{BC} \llcorner 90$ in such a blocking relay may have a current compensation signal added. For example, a signal R $[(I_A-I_o) Z_{R1}+I_oK_oZ_{Ro}]$ shifts the "remembered" $V_{BC}$ signal at the blocking relay closer in phase with "the remembered" $V_{BC}$ signal at the remote tripping relay when load flows over the line causing an angular separation of the voltages at the two terminals.

The relays of the present invention are suitable for direct tripping duty where the relays are set to "underreach" the remote terminal and trip without supervision. Also, the relays may be supervised by "out of step" detection relays, potential failure detection relays, etc. The relays may also be employed for directional comparison relay schemes where the relay is set to "overreach" the remote terminal and the tripping output of the relay is supervised by a communication signal received from the remote terminal at which location the signal transmission is controlled by a tripping or blocking relay.

Also, although the quadrature polarizing voltage has been described as being shifting 90° leading, other variations, e.g., 120° leading, are suitable for certain applications. Further, it is to be noted that, although the quadrature polarizing voltage is preferable for many applications, for some applications, other polarizing signals may be employed.

GENERAL CONSIDERATIONS

Circuitry

Referring again to the functional block diagram of FIG. 2, signals proportional to the phase currents $I_A$, $I_B$, $I_C$ from the protected line enter the relay through transactors (not shown) which provide a replica impedance of the positive sequence impedance of a line with a typical impedance angle, e.g., 85°. A signal proportional to the zero sequence, or residual current, enters the relay through another transactor (not shown) which is a replica impedance of the zero sequence impedance of a line with a typical impedance angle; e.g., 75 degrees. The relay base reach impedance taps, which are used for establishing the magnitude of the replica impedances, are on the primary winding of the transactors. The voltage circuits enter the relay through a star/star/broken delta potential transformer which provides isolation for the voltage signals and derives a signal representative of the zero sequence voltage.

The above voltage circuits and phase current are processed by the signal derivation circuitry 14. For a general discussion of signal derivation circuitry and schematic circuit diagrams for static relays, see "Printed Circuit Cards for MODIII Static Relay Equipment", Instructions GEK-34158A, available from Power Systems Management Department, General Electric Company, Philadelphia, Pa.

Further discussion of such background material, well known to those skilled in the art, can be found in other available references. For example, positive, negative and zero sequence current and voltage symmetrical component networks are described in the textbook, "Symmetrical Components", by Wagner and Evans, published by McGraw-Hill in 1933 and in U.S. Pat. No. 3,992,651 entitled, "Active Symmetrical Component Network For Protective Relays", which issued Nov. 16, 1976 and is assigned to the assignee of the present application. Similarly, transactor circuits and devices are well known in the art; one suitable reference is U.S. Pat. No. 3,374,399, entitled, "Distance Protective Relaying", issued Mar. 19, 1968 and assigned to the assignee the the present application.

Figure 10A:
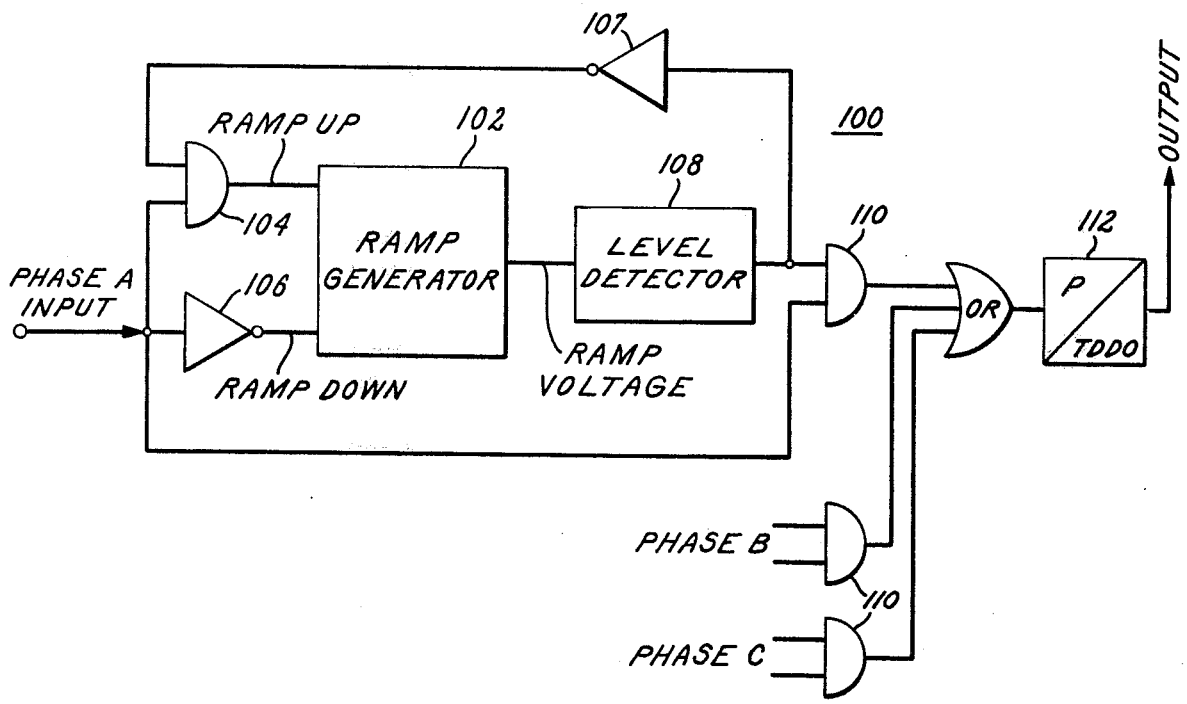
FIG. 10A is a circuit diagram depicting one form of integrating timer suitable for use in the present invention.

For the TIMER 20, I have found it preferably to use an integrating timer circuit, designated 100, and shown in FIG. 10A. The timer circuit 100 includes a ramp generator 102, which may comprise an operational amplifier. The ramp generator 102 is coupled to receive ramp up and ramp down inputs respectively through first AND gate 104 and inverter 106. The ramp generator 102 produces a ramp voltage signal which is fed into level detector 108. The output of level detector 108 is directed back through inverter 107 to the first AND gate 104 and also to a second AND gate 110. The second AND gate 110 also receives the input signal to the timer circuit 100. The output of the second AND gate 110 is fed into an instantaneous pick-up (P) time delay drop-out timer (TDDO) 112 whose output represents the output of the timer circuit 100.

Figure 10B:
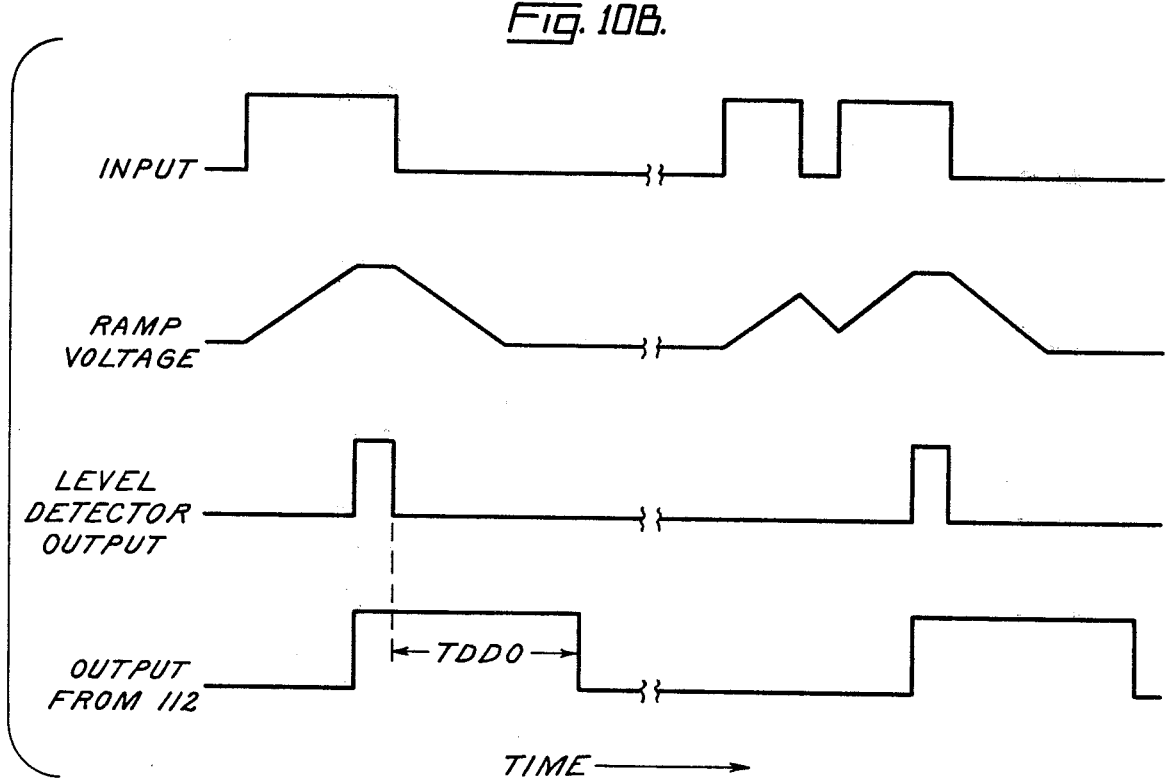
FIG 10B is a timing diagram for the timer circuit of FIG. 10A.

The timing diagram of FIG. 10B shows that when the input signal to the timer circuit 100 is high, ramp generator 102 produces a positive going ramp of voltage. When this positive ramp reaches the threshold voltage of the level detector 108, the ramp voltage is truncated and the instantaneous pick-up, time-delay drop-out timer 112 produces its output. This output continues as long as the input is high, and for a time equal to the drop-out time after the input goes low. When the input goes low, the ramp generator 102 causes the ramp voltage to have a negative slope wherein the level detector output signal goes low.

The timer circuit 100 has two features which contribute to the combination of speed and security. First, it uses a ramp generator, with both "ramp up" and "ramp down" rates, to produce an "integrating timer" effect. The result is that if the timer input has a short duration gap between blocks, the timer is only partially reset, and integrates the effect of the blocks before and after the gap. The second feature is that the timer has both a "pulse pickup" and a steady-state pickup setting. In order to operate on the first block to appear at its input, that block must be wider than the steady-state setting. Typical settings are 5.5 ms. pulse pickup and 4.2 ms steady-state for a 60 hertz system.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of my invention.

What is claimed as new and desired to be secured by Letters Patent of the United States is:

1. In a ground distance protective relay for a transmission line in an a-c power system, the relay circuit including phase angle comparator operation wherein AND circuit means is responsive to phase coincidence of a plurality of input signals thereto, one input signal being an operating signal and another input signal being a first polarizing signal, the operating signal being related to the sum of (1) the product of transmission line current and a replica impedance of the transmission line and (2) transmission line voltage, the first polarizing signal being related to transmission line voltage, TIMER circuit means responsive to an output signal of the AND circuit means for producing a TIMER output signal when the phase coincidence of the plurality of signals is of a predetermined duration, wherein the improvement comprises:

means for providing a second polarizing signal, said second polarizing signal being related to the zero sequence voltage of the transmission line at the relay;

means for providing a current supervision signal, said current supervision signal being related to the product of the zero sequence current of the transmission line at the relay and a replica impedance of the transmission line; and wherein the AND circuit means is responsive to the phase coincidence of: (1) the operating signal, (2) the first polarizing signal, (3) the second polarizing signal, and (4) the current supervision signal; the TIMER circuit means producing said TIMER output signal when the phase coincidence of the four input signals is of a predetermined duration.

2. A circuit in accordance with claim 1 in which said second polarizing signal is proportional to the negative of the zero sequence voltage.

3. A circuit in accordance with claim 2 in which said second polarizing signal includes a current compensation component.

4. A circuit in accordance with claim 1 in which said transmission line comprises one phase of a three phase power system and in which said first polarizing signal comprises a phasor having substantially the same phase position as the line to neutral voltage of said transmission line.

5. A circuit in accordance with claim 4 in which said first polarizing signal is proportional to the phase voltage between the other two phases shifted 90 degrees leading.

6. A circuit in accordance with claim 1 in which said transmission line comprises one phase of a three phase power system and in which said first polarizing signal is proportional to the sum of (1) the phase voltage between the other two phases shifted 90 degrees leading and (2) a percentage of said product of transmission line current and replica impedance of said operating signal.

7. A circuit in accordance with claim 1 in which said transmission line comprises one phase of a three phase power system and in which said first polarizing signal is proportional to the phase voltage between the other two phases shifted 120 degrees leading.

8. A circuit in accordance with claim 1 in which said relay has substantially the combined functional characteristics of a ground distance relay and a compensated zero sequence directional relay.

9. In a ground distance protective relay for a transmission line in an a-c power system, the relay circuit including phase angle comparator operation wherein AND circuit means is responsive to phase coincidence of a plurality of input signals thereto, one input signal being an operating signal and another input signal being a first polarizing signal, the operating signal being related to the sum of (1) the product of transmission line current and a replica impedance of the transmission line and (2) transmission line voltage, the polarizing signal being related to transmission line voltage, TIMER circuit means responsive to an output signal of the AND circuit means for producing a TIMER output signal when the phase coincidence of the plurality of signals is of a predetermined duration, wherein the improvement comprises:

means for providing a second polarizing signal, said second polarizing signal being related to the zero sequence voltage of the transmission line at the relay; and wherein the AND circuit means is responsive to the phase coincidence of: (1) the operating signal, (2) the first polarizing signal, and (3) the second polarizing signal, the TIMER circuit means producing said TIMER output signal when the phase coincidence of the three input signals is of a predetermined duration.

10. A circuit in accordance with claim 9 in which said second polarizing signal is proportional to the negative of the zero sequence voltage.

11. A circuit in accordance with claim 10 in which said second polarizing signal includes a current compensation component.

12. A circuit in accordance with claim 9 in which said transmission line comprises one phase of a three phase power system and in which said first polarizing signal comprises a phasor having substantially the same phase position as the line to neutral voltage of said transmission line.

13. A circuit in accordance with claim 12 in which said first polarizing signal is proportional to the phase voltage between the other two phases shifted 90 degrees leading.

14. A circuit in accordance with claim 9 in which said transmission line comprises one phase of a three phase power system and in which said first polarizing signal is proportional to the sum of (1) the phase voltage between the other two phases shifted 90 degrees leading and (2) a percentage of said product of transmission line current and replica impedance of said operating signal.

15. A circuit in accordance with claim 9 in which said transmission line comprises one phase of a three phase power system and in which said first polarizing signal is proportional to the phase voltage between the other two phases shifted 120 degrees leading.

16. In a ground distance protective relay for a transmission line in an a-c power system, the relay circuit including phase angle comparator operation wherein AND circuit means is responsive to phase coincidence of a plurality of input signals thereto, one input signal being an operating signal and another input signal being a first polarizing signal, the operating signal being related to the sum of (1) the product of transmission line current and a replica impedance of the transmission line and (2) transmission line voltage, the polarizing signal being related to transmission line voltage, TIMER circuit means responsive to an output signal of the AND circuit means for producing a TIMER output signal when the phase coincidence of the plurality of signals is of a predetermined duration, wherein the improvement comprises:

means for providing a current supervision signal, said current supervision signal being related to the product of the zero sequence current of the transmission line at the relay and a replica impedance of the transmission line; and wherein the AND circuit means is responsive to the phase coincidence of: (1) the operating signal, (2) the first polarizing signal, and (3) the current supervision signal; the TIMER circuit means producing said TIMER output signal when the phase coincidence of the three input signals is of a predetermined duration.

17. A circuit in accordance with claim 16 in which said transmission line comprises one phase of a three phase power system and in which said first polarizing signal comprises a phasor having substantially the same phase position as the line to neutral voltage of said transmission line.

18. A circuit in accordance with claim 16 in which said transmission line comprises one phase of a three phase power system and in which said first polarizing signal is proportional to the sum of the line to neutral voltage and a percentage of the positive sequence component of the line to neutral voltage of said transmission line.

* * * * *